(12) United States Patent
Sokolov et al.

(10) Patent No.: US 9,319,181 B2
(45) Date of Patent: Apr. 19, 2016

(54) PARALLEL DECODER FOR MULTIPLE WIRELESS STANDARDS

(75) Inventors: Andrey P. Sokolov, Moscow (RU);
Elyar E. Gasanov, Moscow (RU); Pavel A. Panteleev, Moscow (RU); Ilya V. Neznanov, Moscow (RU); Yurii S. Shutkin, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 525 days.

(21) Appl. No.: 13/291,285

(22) Filed: Nov. 8, 2011

(65) Prior Publication Data
US 2012/0281790 A1   Nov. 8, 2012

(30) Foreign Application Priority Data
May 6, 2011   (RU) ................................ 2011118108

(51) Int. Cl.
*H03K 9/00* (2006.01)
*H04B 1/38* (2015.01)
*H04L 1/00* (2006.01)

(52) U.S. Cl.
CPC ............ *H04L 1/0054* (2013.01); *H04L 1/0052* (2013.01); *H04L 1/0059* (2013.01); *H04L 1/0066* (2013.01)

(58) Field of Classification Search
USPC ......... 375/328, 336, 267, 219, 262, 265, 295, 375/299, 316, 340, 341, 211, 220, 221, 222, 375/240.26–240.29, 260, 271, 285, 284, 375/297, 302, 3, 16, 324, 325, 322, 338, 375/339, 343, 346–347, 240, 240.24, 375/240.28, 263, 264, 278, 326, 342; 455/501; 714/E11.032, 752, 758

See application file for complete search history.

(56) References Cited

U.S. PATENT DOCUMENTS

| | | | | |
|---|---|---|---|---|
| 5,583,500 | A * | 12/1996 | Allen et al. ................... | 341/107 |
| 5,594,720 | A | 1/1997 | Papadopoulos et al. ...... | 370/330 |
| 5,717,394 | A * | 2/1998 | Schwartz et al. .............. | 341/51 |
| 5,808,570 | A * | 9/1998 | Bakhmutsky .................. | 341/65 |
| 6,563,877 | B1 | 5/2003 | Abbaszadeh ................. | 375/242 |
| 6,980,605 | B2 | 12/2005 | Gatherer et al. ............. | 375/340 |
| 7,113,554 | B2 | 9/2006 | Dielissen et al. ............. | 375/341 |
| 7,827,473 | B2 | 11/2010 | Lee et al. ...................... | 714/794 |
| 7,881,320 | B1 * | 2/2011 | Schumacher ........ | H04N 21/226 370/383 |
| 2002/0154042 | A1* | 10/2002 | Igarashi et al. ................. | 341/67 |
| 2003/0154347 | A1* | 8/2003 | Ma et al. ....................... | 711/131 |
| 2005/0052935 | A1* | 3/2005 | Miyo et al. .............. | 365/230.03 |
| 2005/0122824 | A1* | 6/2005 | Lee .......................... | 365/230.05 |
| 2006/0039317 | A1 | 2/2006 | Subramanian et al. ....... | 370/328 |
| 2006/0143428 | A1* | 6/2006 | Noda et al. ...................... | 712/10 |

(Continued)

FOREIGN PATENT DOCUMENTS

WO    WO 2006128164 A2 * 11/2006

*Primary Examiner* — Linda Wong (57) ABSTRACT

A method of parallel decoding for a plurality of communications standards generally including steps (A) to (C) is disclosed. Step (A) may receive a plurality of first words, at least two of the first words generally have a different length than each other. Step (B) may parse the first words into a plurality of memories. Step (C) may generate a plurality of second words by decoding the first words using a plurality of decoders. The decoders generally operate in parallel. The decoding of at least one of the first words may be performed by at least two of the decoders. The decoding is generally based on a signal that identifies a current one of the communications standards used to transfer the first words.

20 Claims, 7 Drawing Sheets

(56) References Cited

U.S. PATENT DOCUMENTS

| | | |
|---|---|---|
| 2007/0205929 A1* | 9/2007 | Raveendran et al. ............ 341/67 |
| 2007/0247884 A1* | 10/2007 | Stewart ............................ 365/49 |
| 2008/0049844 A1* | 2/2008 | Liu et al. ................... 375/240.27 |
| 2008/0144728 A1* | 6/2008 | Ruehle ........................... 375/253 |
| 2009/0063937 A1* | 3/2009 | Au et al. ......................... 714/784 |
| 2009/0083608 A1* | 3/2009 | Au et al. ......................... 714/784 |
| 2009/0172359 A1* | 7/2009 | Shen et al. ..................... 712/215 |
| 2009/0210547 A1* | 8/2009 | Lassen et al. .................. 709/230 |
| 2009/0241008 A1* | 9/2009 | Kim et al. ...................... 714/755 |
| 2009/0245426 A1* | 10/2009 | Ratnakar et al. .............. 375/327 |
| 2009/0309770 A1* | 12/2009 | Andreev et al. .................. 341/81 |
| 2010/0008430 A1* | 1/2010 | Karczewicz et al. .... 375/240.25 |
| 2010/0046627 A1* | 2/2010 | Xiao et al. ................ 375/240.23 |
| 2010/0058143 A1* | 3/2010 | Dabiri et al. ................... 714/752 |
| 2010/0153819 A1* | 6/2010 | Ueng et al. ..................... 714/763 |
| 2010/0268918 A1* | 10/2010 | Priewasser et al. ............ 712/208 |
| 2011/0116550 A1* | 5/2011 | Lee ........................ H04N 19/61 |
| | | 375/240.25 |
| 2011/0161782 A1* | 6/2011 | Engin ............................ 714/763 |
| 2011/0167313 A1* | 7/2011 | Miller et al. ................... 714/752 |
| 2011/0302475 A1* | 12/2011 | Eisenhuth et al. ............. 714/763 |
| 2014/0143641 A1* | 5/2014 | Chaichanavong et al. .... 714/795 |

* cited by examiner

PARALLEL DECODER FOR MULTIPLE WIRELESS STANDARDS

This application claims the benefit of Russian Application No. 2011118108, filed May 6, 2011 and is hereby incorporated by reference in its entirety.

The present application is related to co-pending Russian Application Numbers 2010148337 filed Oct. 29, 2010, 2010149150 filed Dec. 2, 2010, 2010147930 filed Nov. 25, 2010, and 2011117765 filed May 5, 2011, hereby incorporated by reference in their entirety.

FIELD OF THE INVENTION

The present invention relates to wireless communications decoding generally and, more particularly, to a method and/or apparatus for implementing a parallel decoder for multiple wireless standards.

BACKGROUND OF THE INVENTION

Wireless standards are used extensively in convolutional codes and turbo codes. Decoding processes for the codes were originally proposed by A. J. Viterbi in the late 1960's and by C. Berrou, A. Glavieux and P. Thitimajshima in 1993. The decoding processes of Viterbi and Berrou et al. have been adopted in many communications standards such as Wideband-CDMA (i.e., WCDMA), Code Division Multiple Access 2000 (i.e., CDMA2000), Worldwide Interoperability for Microwave Access (i.e., WiMAX), Long Term Evolution (i.e., LTE) and Digital Video Broadcasting-Return Channel via Satellite (i.e., DVB-RCS). The codes allow near optimal decoding with excellent performance approaching the Shannon limit for additive white gaussian noise (i.e., AWGN) channels. Therefore, high-speed and low-area architectures for multistandard convolutional and turbo decoders are of practical importance.

The convolutional codes are used for transferring code words of a small size while turbo codes are used for long code words. Widely used techniques for decoding convolutional codes and turbo codes are a Viterbi technique and a logarithm-maximum a posteriori (i.e., Log-MAP) technique respectively. If high speed decoding is specified, the Viterbi and Log-MAP techniques are expensive in terms of the number of arithmetic operations computed in each clock cycle. Currently, no known substitutions exist for the Log-MAP and the Viterbi techniques that could provide comparable quality for decoding. At the same time, implementations of the Log-MAP and Viterbi decoding techniques differ from each other. Therefore, sharing common hardware for the two techniques in a decoder design is difficult. Because of the above problems, universal decoders that support both turbo codes and convolutional codes often contain a sub-scheme for the turbo decoder and another sub-scheme for the convolutional decoder. Usually only memory is shared between the sub-decoders. A disadvantage of such solutions is that a large silicon area is consumed to implement both sub-decoders.

Different wireless standards use different types of turbo and convolutional codes. For example, the WiMAX standard uses duo-binary turbo codes while the LTE standard uses single-binary versions. The decoding procedures for the different standards differ from each other. Thus, decoding of the WiMAX duo-binary turbo codes is usually done with a radix-4 modification of the Log-MAP technique while the LTE turbo codes are usually decoded with a radix-2 modification of the Log-MAP technique. Other differences between the turbo codes and the convolutional codes are also present in different wireless standards. From such a point of view, trivial solutions for high-speed multistandard decoders for both turbo codes and convolutional codes would contain different sub-decoders for each of the different types of codes. Such solutions would have a large silicon area.

Throughput of the decoders are designed to match high data transfer rates of the wireless devices. Some features of common decoding techniques used for the convolutional codes and the turbo codes make the decoder demanding in terms of computing power. Consequently, the area of the conventional high speed convolutional decoders and the turbo decoders becomes large. Moreover, different wireless standards use different types of convolutional codes and turbo codes that make the area of the multistandard decoders even larger.

It would be desirable to implement a parallel decoder for multiple wireless standards.

SUMMARY OF THE INVENTION

The present invention concerns a method of parallel decoding for a plurality of communications standards generally including steps (A) to (C). Step (A) may receive a plurality of first words, at least two of the first words generally have a different length than each other. Step (B) may parse the first words into a plurality of memories. Step (C) may generate a plurality of second words by decoding the first words using a plurality of decoders. The decoders generally operate in parallel. The decoding of at least one of the first words may be performed by at least two of the decoders. The decoding is generally based on a signal that identifies a current one of the communications standards used to transfer the first words.

The objects, features and advantages of the present invention include providing a method and/or apparatus for implementing a parallel decoder for multiple wireless standards that may (i) implement multiple decoding core circuits, (ii) implement a sliding window Log-MAP decoding technique, (iii) organize code words of different length into a common frame, (iv) provide high throughput decoding and/or (v) decode code words from multiple wireless communications standards.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention generally support many types of turbo codes and convolutional codes simultaneously that may be used in modern wireless standards. Decoding may include a high speed radix-4 modification of both the Log-MAP technique and the Viterbi technique for turbo codes and convolutional codes. Additional information for the radix-4 modification may be found in co-pending Russian Application No. 2010149150 filed Dec. 2, 2010, hereby incorporated by reference in its entirety. The high speed radix-4 modification generally allows the use of the same hardware sub-modules of the design for both convolutional decoding and turbo decoding. The reuse generally decreases a total area of the design. High throughput in some embodiments of the present scheme is generally provided by multiple decoding cores that work in parallel. Each of the decoding cores may implement a sliding window log-MAP technique. The sliding window log-MAP technique is generally described by H. Dawid and H. Meyr, "Real-time algorithms and VLSI architectures for soft output MAP convolutional decoding," in Proc. Personal, Indoor and Mobile Radio Communications, PIMRC'95, vol. 1, 1995, pp. 193-197, hereby incorporated by reference in its entirety. As a result, the area of the developed scheme is generally comparable with the smallest known single standard solutions that provide such a high throughput.

Decoding for multiple wireless communications standards is generally supported. The wireless communications standards may include, but are not limited to, LTE (e.g., 3GPP Release 8), WiMAX (e.g., IEEE 802.16), WCDMA/HSPA (e.g., 3GPP Release 7), CDMA-2000/UMB (e.g., 3GPP2), DVB-RCS. The convolutional codes and turbo codes implemented within the above standards are generally used in many modern wireless communications systems. Some embodiments of the present invention may support MAP decoding for turbo codes. Some embodiments may support the Viterbi technique for convolutional codes. The scheme may be flexible in terms of the provided throughput because the number of decoding cores may be reconfigured, depending on the system criteria.

Some embodiments of the invention generally implement a multicore architecture. A decoding engine may contain multiple decoding cores that work in parallel and provide a high throughput. The resulting architecture may be flexible: varying number of the decoding cores in the decoding engine generally varies the throughput that may be achieved. Likewise, if a lower throughput is sufficient, the number of the decoding cores may be decreased thereby reducing the area of the design. Estimates of the throughput depending on the number of decoding cores for clock frequency of 600 megahertz (MHz) are generally provided in TABLE 1 as follows:

TABLE 1

|  | Number of Decoding Cores | | | |
| --- | --- | --- | --- | --- |
|  | 1 | 2 | 4 | 8 |
| LTE Turbo Codes | 75 | 150 | 300 | 600 |
| WiMAX Turbo Codes | 75 | 150 | 300 | 600 |
| WCDMA Turbo Codes | 56 | 112 | 225 | 450 |
| Convolutional Codes (all standards) | 18 | 37 | 75 | 150 |

Each decoding core may implement the sliding window log-MAP technique. The sliding window modification of the MAP technique is generally at least two times faster than a regular double-pass technique. At the same time, memory utilization for the single-pass technique of the sliding window modification may also be smaller than the double-pass technique. As a result the hardware implementation of the decoder may be efficient and fast.

A stream of code words fed into the decoding engine is generally organized as a frame. Usually turbo decoders or convolutional decoders operate in a sequential manner. The sequential operation generally means that the code words are decoded sequentially, one by one. Sequential organization of the decoding may simplify the architecture because control logic becomes simpler.

The modern wireless communications standards generally support code words of different sizes. For example, the WCDMA standard may support code words of any size from 40 bits to 6114 bits. Therefore, situations may exist where the stream of the code words to be decoded consists primarily of the short code words with different sizes. Such situations generally take place when radio conditions at a receiver antenna are very bad (e.g., a signal-to-noise ratio is very small). In such cases, the overhead expense taken by a common sequential decoder to reconfiguration each time the size of the code word changes becomes significant in terms of the average throughput. In some embodiments of the present invention, the decoding engine may be designed to decode frames having different numbers of the code words. Each frame generally has a predefined maximum size. Each frame may contain either a single code word of the maximum size or several code words of one or more smaller sizes. The code words may be buffered outside the decoding engine into a frame. Thereafter, the code words within the frame may be decoded by the decoding engine.

Figure 1:
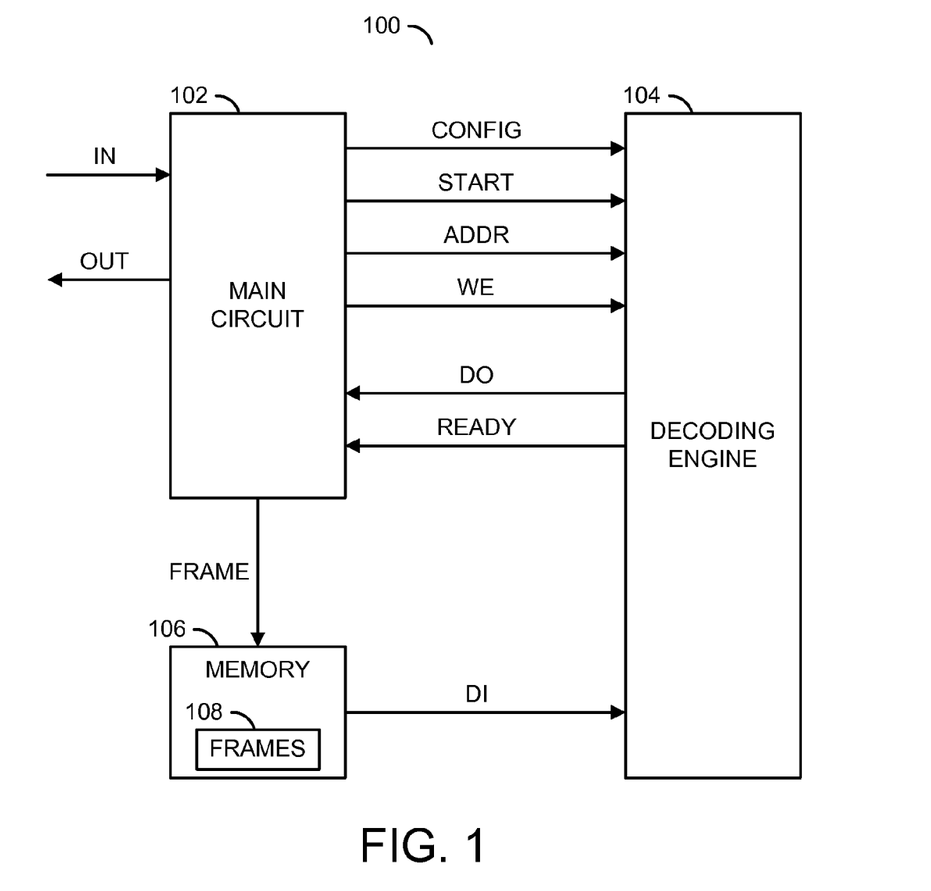
FIG. 1 is a block diagram of a circuit in accordance with a preferred embodiment of the present invention.

Referring to FIG. 1, a block diagram of a circuit 100 is shown in accordance with a preferred embodiment of the present invention. The circuit (or device, apparatus or integrated circuit) 100 may implement a parallel decoder for multiple wireless communications standards. The circuit 100 generally comprises a block (or circuit) 102, a block (or circuit) 104 and a block (or circuit) 106. The circuits 102 to 106 may represent modules and/or blocks that may be implemented as hardware, firmware, software, a combination of hardware, firmware and/or software, or other implementations.

An input signal (e.g., IN) may be received by the circuit 102. The circuit 102 may generate an output signal (e.g., OUT). A signal (e.g., FRAME) may be generated by the circuit 102 and transferred to the circuit 106. The circuit 106 may generate a data input signal (e.g., DI) that is received by the circuit 104. A configuration signal (e.g., CONFIG) may be generated by the circuit 102 and received by the circuit 104. The circuit 102 may also generate a signal (e.g., START) that is received by the circuit 104. The circuit 104 may receive an address signal (e.g., ADDR) from the circuit 102. A write enable signal (e.g., WE) may be generated by the circuit 102 and presented to the circuit 104. The circuit 104 may generate a data output signal (e.g., DO) that is received by the circuit 102. A signal (e.g., READY) may also be generated by the circuit 104 and presented to the circuit 102.

The circuit 102 may implement a main circuit. The circuit 102 is generally operational to receive a stream of the encoded code words in the signal IN. The circuit 102 may combine sets of the received codes words into frames 108. The resulting frames 108 are generally written by the circuit 102 into the circuit 106 via the signal FRAME. The circuit 102 may also be operational to receive a frame of decoded code words (decoded words) from the circuit 104 in the signal DO. The decoded words are generally presented by the circuit 102 in the signal OUT in either the frame format or in a sequential format. Additional details regarding an example scheme to generate the frames 108 may be found in copending Russian Application No. 2011117765, hereby incorporated by reference in its entirety. The circuit 102 may also be operational to generate a set of signals that control the circuit 104. The signal CONFIG may convey an identity of the particular wireless communications standard that corresponds to the code words buffered in the circuit 106. The signal START may notify the circuit 104 that a frame is available in the circuit 106 for processing. The signal WE may be a write enable signal that indicates if the circuit 102 is writing to or reading from the circuit 104. In the write condition, the signal ADDR generally points to memory locations internal to the circuit 104 where the code words should be initially buffered. In the read condition, the signal ADDR may point to a location within the internal memory of the circuit 104 to read the decoded code words.

The circuit 104 may implement the decoding engine circuit. The circuit 104 is generally operational to receive one or more frames 108 with the encoded code words from the circuit 106 via the signal DI. In some situations, at least two of the code words within a frame 108 may have a different length than each other. The circuit 104 may also parse the frames 108 into multiple internal memory locations. Once the frames 108 have been parsed and buffered, the circuit 104 may generate one or more decoded frames by decoding th encoded code words using a plurality of decoders. The decoders of the circuit 104 generally operate in parallel. In some situations, decoding of one or more of the code words may be performed by two or more of the decoders. The particular decoding technique performed by the circuit 104 is generally based on configuration information received in the signal CONFIG. The configuration information may identify a current one of the multiple communications standards that the circuit 104 may be designed to decode.

The circuit 106 may implement a memory circuit. The circuit 106 is generally operational to buffer one or more frames 108 at a time as received in the signal FRAME. The circuit 106 generally presents the frames 108 to the circuit 104 in the signal DI. In some embodiments, the circuit 106 may be internal to the circuit 102.

Figure 2:
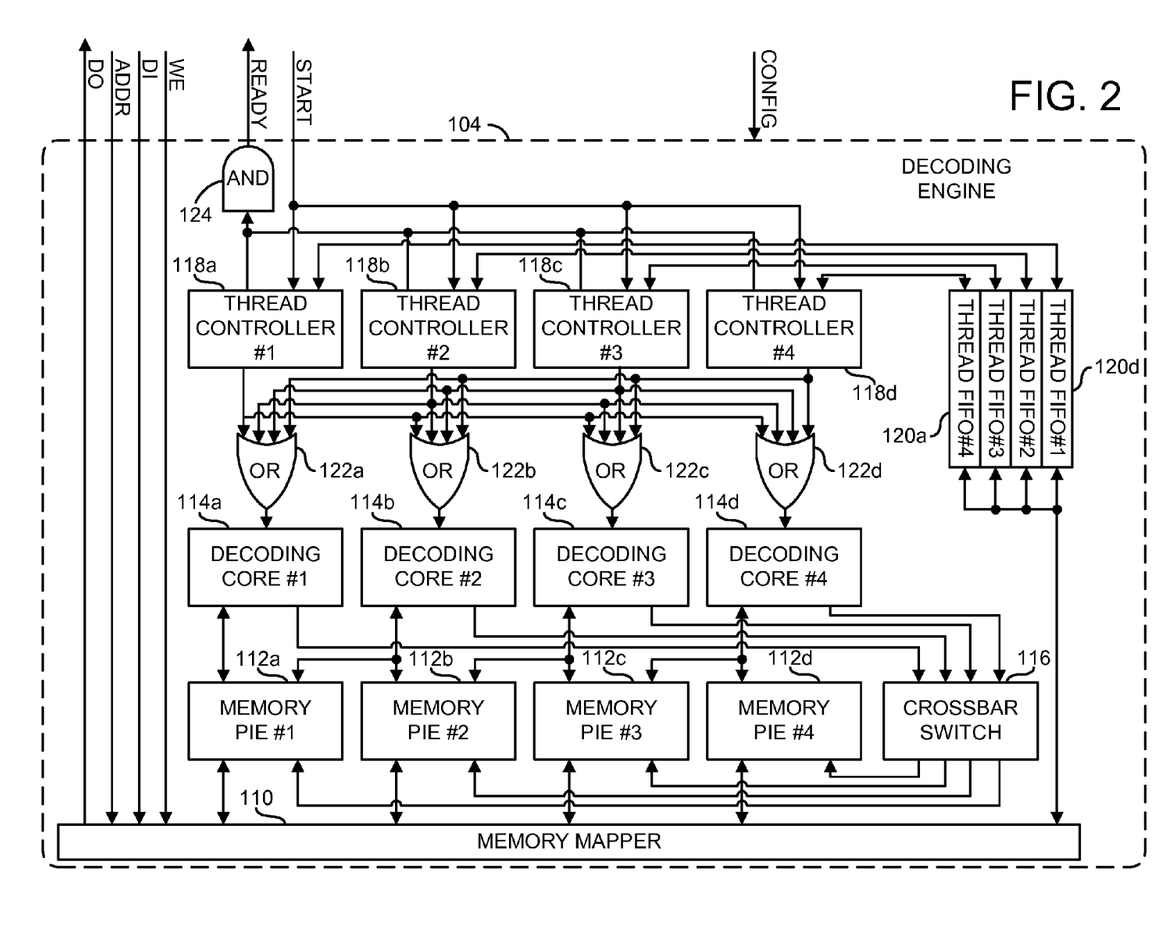
FIG. 2 is a detailed block diagram of an example implementation of a decoding engine.

Referring to FIG. 2, a detailed block diagram of an example implementation of the circuit 104 is shown. The circuit 104 generally comprises a block (or circuit) 110, multiple blocks (or circuits) 112a-112d, multiple blocks (or circuits) 114a-114d, a block (or circuit) 116, multiple blocks (or circuits) 118a-118d, multiple blocks (or circuits) 120a-120d, multiple blocks (or circuits) 122a-122d and a block (or circuit) 124. The circuits 110 to 124 may represent modules and/or blocks that may be implemented as hardware, firmware, software, a combination of hardware, firmware and/or software, or other implementations.

The signal CONFIG may be received by the circuit 104. The signal DO may be generated by the circuit 110. The signal. ADDR may be received by the circuit 110. The circuit 110 may also receive the signal DI. The signal WE may be received by the circuit 110. The signal START may be received by the circuits 118a-118d. The circuit 124 may generate the signal READY.

The circuit 110 may implement a memory mapper circuit. The circuit 110 is generally operational to receive encoded frames 108 via the signal DO. The circuit 110 may parse the received frames into the circuits 112a-112d. The circuit 110 may also read decoded frames from the circuits 112a-112d. The decoded frames may be transmitted by the circuit 110 to the circuit 102 in the signal DO. The circuit 110 may also communicate with the circuits 120a-120d to transfer thread information to and from the circuits 120a-120d. From a point of view of the circuit 102, the circuit 104 may appear as a memory circuit due to the operations of the circuit 110. Writes from the circuit 102 to the circuit 104 may be performed as normal writes to memory using the signal WE to indicate a read/write direction, the signal ADDR to convey addresses and the signals DI and DO to carry input data and output data respectively. In some embodiments, the circuit 110 may map all internal memories (e.g., circuits 112a-112d and 120a-120d) of the circuit 104 into a single address space.

Each circuit 112a-112d may implement a memory circuit. The circuits 112a-112d may be operational to buffer encoded frames, encoded code words, decoded frames, decoded code words and associated information associated with the decoding operation. Control of the circuits 112a-112d is generally provided by the circuit 110. In some embodiments, the circuits 112a-112d may be implemented by a one or more multi-port memory circuits.

Each circuit 114a-114d may implement a decoding core circuit. The circuits 114a-114d are generally operational to decode the frames/code words buffered in the circuits 112a-112d to generate decoded frames/code words. Each circuit 114a-114d may be configurable by the signal CONFIG to perform a commanded type of decoding in accordance with a current standard among the multiple wireless communications standards. The circuits 114a-114d generally operate independently of each other. Therefore, the circuits 114a-114d may operate in parallel. Each circuit 114a-114d may have direct access to one or more (e.g., two) of the circuits 112a-112d. All of the circuits 114a-114d may have access to all of the circuits 112a-112d through the circuit 116. In some embodiments, each circuit 114a-114d may implement a sliding window Log-MAP decoder. Other decoder configurations may be implemented to meet the criteria of a particular application. In some configurations, each circuit 114a-114d may decode a respective code word buffered in the circuits 112a-112d. In other configurations, two or more of the circuits 114a-114d may work together to decode a single code word. In still other configurations, all of the circuits 114a-114d may work to decode a single code word. Selections of which circuits 114a-114d decode which of the code words at any given time may be controlled by the circuits 118a-118d.

The circuit 116 may implement a crossbar switch circuit. The circuit 116 is generally operational to route data from the circuits 114a-114d to the circuits 112a-112d.

Each circuit 118a-118d may implement a thread controller circuit. The circuits 118a-118d are generally operational to control the circuits 114a-114d based on one or more threads to decode the frames and code words. The circuits 118a-118d may receive the threads from the circuits 120a-120d.

Each circuit 120a-12d may implement a first-in-first-out (e.g., FIFO) circuit. The circuits 120a-120d may be operational to buffer decoding threads received from the circuit 110. Each circuit 120a-120d may present a respective decoding thread to a corresponding one of the circuits 118a-118d.

Each circuit 122a-122 may implement a logical OR circuit. The circuits 122a-122d are generally operational to route control signals from the circuits 118a-118d to the circuits 114a-114d. The circuits 122a-122d generally enable each of the circuits 118a-118d to configure one or more of the circuits 114a-114d at a time based on the threads.

The circuit 124 may implement a logical AND gate. The circuit 124 is generally operational to assert the signal READY in an end (or finished) condition when all of the circuits 118a-118d indicate that all of the decoding threads have been completed. While one or more decoding threads are in progress, the circuit 124 may drive the signal READY to a busy (or working) condition.

The decoding procedure generally involves the following stages. The circuit 102 may create a frame 108 from the code words in accordance with the defined format. Each frame 108 generally contains a set of the code words to be decoded and some additional information. The additional information generally instructs the circuit 104 how the frame 108 is arranged. For example, the additional information may include, but is not limited to, how many code words are in the frame 108 and the sizes of the individual code words. In some embodiments, the additional data may include the decoding threads. In some embodiments, the additional information may include the identification of the current wireless communications standard used to transmit the code words. In such embodiments, the signal CONFIG may be removed.

After the frame 108 is created, the circuit 102 may write the frame 108 to the circuit 106. From the circuit 106, the frame 108 may be copied via the signal DI into the internal memories (e.g., the circuits 112a-112d) of the circuit 104. The copying operation is generally done with help of the signals ADDR and WE as input control signals. When frame 108 is completely uploaded into circuits 112a-112d, the circuit 102 may assert (or transition) the signal START from a not-ready (or wait) condition (e.g., a logical zero value) to a go (or begin) condition (e.g., a logical one value). The circuit 104 generally responds to the assertion of the signal START by beginning the decoding process. After decoding of the whole frame 108 is complete, the circuit 104 (e.g., the circuit 124) may assert the signal READY to the end condition. In response, the circuit 102 may read the decoding results from circuits 112a-112d of the circuit 104 in a normal manner using the signals ADDR, WE and DO.

The circuit 104 generally contains several internal memories for storing initial data, results of the decoding and some auxiliary information that is used during the decoding. All of the circuits 112a-112d of the circuit 104 may be grouped in special modules called "memory pies". The memory pie name may characterize a layer structure of the circuits 112a-112d. A detailed description of the layer structure is described later.

The circuit 104 may also contain set of the circuits 114a-114d that actually perform the decoding. The circuits 114a-114d generally read initial and auxiliary data from the circuits 112a-112d. The circuits 114a-114d may then perform the decoding of the frame/code words. The results of the decoding operations are generally written back into the circuits 112a-112d. Because of an iterative nature of the decoding techniques used for turbo codes, the reading-decoding-writing loop may be repeated several times.

The circuits 114a-114d may be controlled by the circuits 118a-118d based on the threads stored in the circuits 120a-120d. Each thread may be run by the individual circuits 118a-118d. A single thread generally defines the decoding process for a single code word. A single thread may utilize from a single circuit (e.g., 114a) to all of the circuits 114a-114d to perform the decoding of a code word. Thus, single code words may be decoded by multiple circuits 114a-114d. Short code words are generally decoded by a single circuit among the circuits 114a-114d. Long code words may be decoded by up to all (e.g., all 4) of the circuits 114a-114d. In some embodiments, the circuits 114a-114d may implement sliding window modification of the log-MAP decoding technique.

The circuits 120a-120d generally store sequences of threads that may be processed for the whole frame 108. In some embodiments, the sequences may be prepared before the actual decoding process—at the stage when the circuit 102 creates the corresponding frame 108. The threads may be transferred from the circuit 102 to the circuits 120a-120d via the signal DI as part of the associated frame 108.

When multiple circuits 114a-114d decode a single code word, the circuits 114a-114d may read initial data from one or more of the circuits 112a-112d. From the other side in such a case, the circuits 114a-114d may generate parallel write requests to the circuits 112a-112d to store auxiliary information used for the decoding. Because of the interleaving used in the turbo codes, write conflicts to the circuits 112a-112d may occur in some situations. To resolve the write conflicts, the circuit 116 may adjust the writing to the circuits 112a-112d as appropriate.

Figure 3:
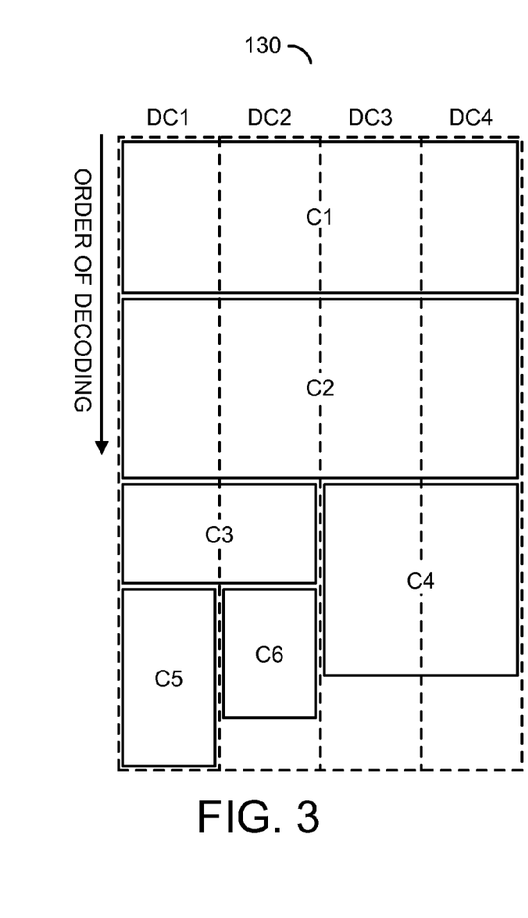
FIG. 3 is a diagram of an example mapping of a frame to decoder core circuits.

Referring to FIG. 3, a diagram of an example mapping of a frame 130 to the circuits 114a-114d is shown. A single frame 130 (e.g., frame 108) generally contains multiple code words (or data items) C1-C6 of different sizes. When the circuit 102 creates the frame 130 for the circuit 104, the code words C1-C6 of the frame 130 may be mapped to circuit 114a-114d (e.g., decoding cores (DC) DC1-DC4). The mapping generally defines for each code word C1-C6 a set of the circuits 114a-114d that may be used to decode the corresponding code words C1-C6. An order (or sequence or direction) of the decoding may also be specified among the code words C1-C6. In the illustrated example, the code words C1 and C2 may be decoded using all four circuits 114a-114d (e.g., DC1-DC4). The code word C3 may be decoded using the circuits 114a and 114b. Simultaneously to decoding the code word C3, the code word C4 may be decoded using the circuits 114c and 114d. Once the code word C3 has been decoded, the circuit 114a may decode the code word C5 and the circuit 114b may decode the code word C6.

Sizes of the rectangles that represent the code words C1-C6 generally correspond to the sizes of the code words. From the example, the circuit 114a (DC1) may participate in decoding of the code words C1, C2, C3 and C5. The circuit 114b may participate in decoding the code words C1, C2, C3 and C6. The circuits 114c and 114d may participate in decoding the code words C1, C2 and C4. As illustrated, code words having longer lengths (e.g., C1, C2, C3 and C4) may use more of the circuits 114a-114d to decode.

Figure 4:
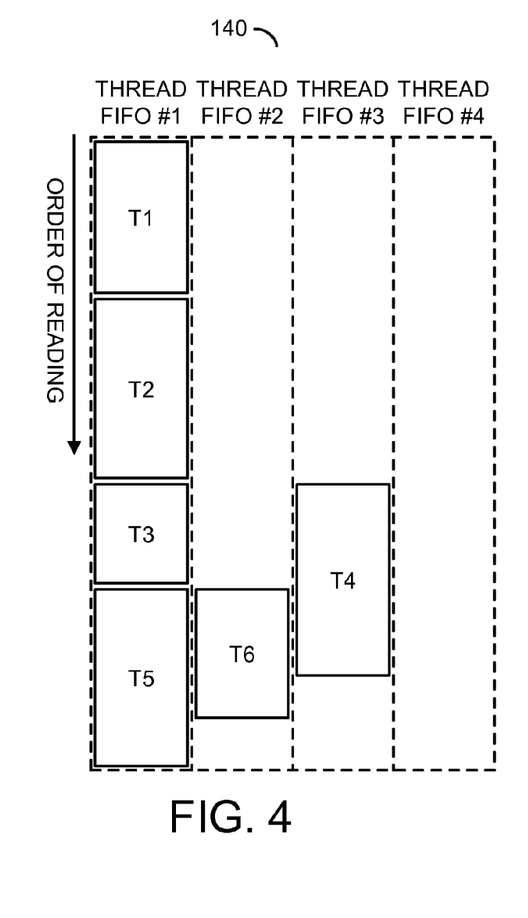
FIG. 4 is a diagram of an example thread sequence.

Referring to FIG. 4, a diagram of an example thread sequence 140 is shown. The circuits 120a-120d generally contain sequences of threads (e.g., T1-T6) that may be executed by the dedicated circuits 118a-118d during the decoding of the frame 130. In general, a single thread T1-T6 is created by the circuit 102 for each of the code words C1-C6 in the frame 130. An order (or sequence or direction) of the threads T1-T6 that corresponds to the mapping example from FIG. 3 is generally depicted in FIG. 4. Thus for code words C1 and C2, threads T1 and T2 may define the order in which the code words C1 and C2 are decoded. The threads T1 and T2 may be run by the circuit 118a. Other circuit 118b-118d may be sleeping during the threads T1 and T2. After the end of the thread T2, two additional threads T3 and T4 may be activated. The thread T3 may be run by circuit 118a. The thread T4 may be run by the circuit 118b. At the end of the thread T3, two additional threads T5 and T6 may be started. The threads T5 and T6 may be run by circuits 118a and 118b respectively. When all of the threads T1-T6 are finished, the circuit 104 may inform the circuit 102 via the signal READY that decoding of the whole frame 130 has complete. As each circuit 118a-118d finishes the threads T1-T6 as assigned, the circuits 118a-118d may assert a respective ready signal to the circuit 124. The circuit 124 may logically AND the results from all circuits 118a-118d and assert the signal READY to the end condition.

The sequence of the threads T1-T6 to be run for the frame 130 is generally computed by an external driver of the circuit 104 (within the circuit 102). The sequence may be uploaded into the circuits 120a-120d before a start of the decoding process. From the hardware point of view, each circuit 120a-120d generally represents an ordinary FIFO module that stores a corresponding sequence of data structures called threads. Each thread may contain, but is not limited to, a list of occupied circuits 118a-118d, a start address and a finish address in the circuits 112a-112d where corresponding code words C1-C6 are stored and (for turbo codes) a maximum number of iterations to be performed by the circuits 114a-114d.

Figure 5:
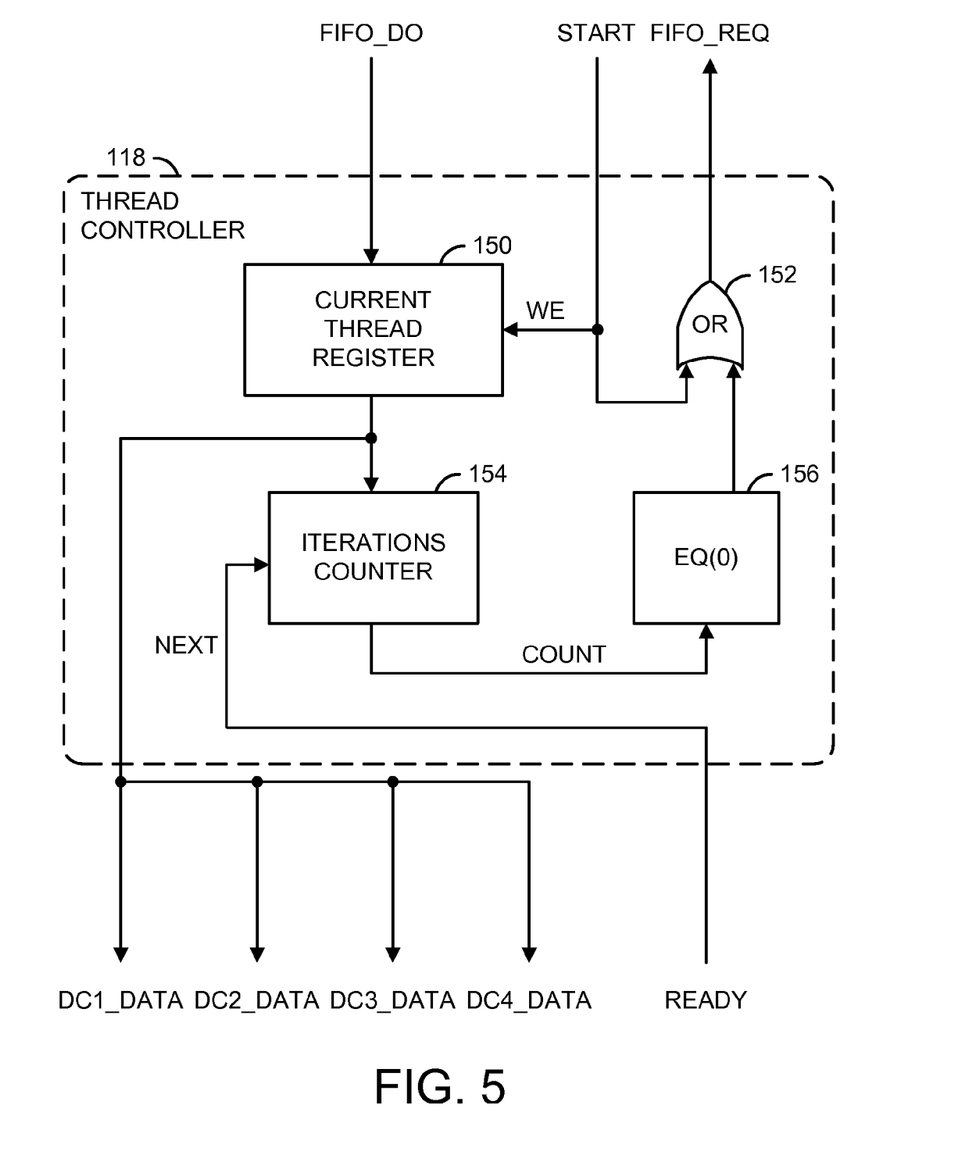
FIG. 5 is a block diagram of an example implementation of a thread controller.

Referring to FIG. 5, a block diagram of an example implementation of a circuit 118 is shown. The circuit (or block) 118 may be representative of the circuits 118a-118d. The circuit 118 generally comprises a block (or circuit) 150, a block (or circuit) 152, a block (or circuit) 154 and a block (or circuit) 156. The circuits 150 to 156 may represent modules and/or blocks that may be implemented as hardware, firmware, software, a combination of hardware, firmware and/or software, or other implementations.

A signal (e.g., FIFO_DO) may be received by the circuit 150 from a respective circuit 120a-120d. The signal START may be received by the circuits 150 and 152. A set of signals (e.g., DC1_DATA, DC2_DATA, DC3_DATA and DC4_DATA) may be generated by the circuit 150 and receive by the circuits 154 and 122a-122d. A signal (e.g., COUNT) may be generated by the circuit 154 and presented to the circuit 156. The signal READY may be received by the circuit 154.

The circuit 150 may implement a current thread register (or memory) circuit. The circuit 150 is generally operational to buffer a current thread as received from the corresponding circuits 120a-120d. The circuit 150 may begin reception of an initial thread upon assertion of the signal START.

The circuit 152 may implement a logical OR circuit. The circuit 152 may assert a signal (e.g., FIFO_REQ) back to the respective circuits 120a-120d when the circuit 118 is ready for another thread. The signal FIFO_REQ may be deasserted otherwise.

The circuit 154 may implement a counter circuit. The circuit 154 is generally operational to count down the number of half iterations performed in the current thread. A count value may be presented in the signal COUNT. An initial count value may be set upon assertion of the signal READY.

The circuit 156 may implement a compare (or equalizer) circuit. The circuit 156 may compare the count value received in the signal COUNT to a zero value. Once the zero value is detected, the circuit 156 may trigger another FIFO request in the signal FIFO_REQ through the circuit 152.

The circuit 118 may receive the signal START from the circuit 102. The circuit 152 may assert the signal FIFO_REQ (e.g., set to a logical one state) to request an initial thread from the respective circuit 120a-120d. The thread data is generally received from the circuits 120a-120d via a signal (e.g., FIFO_DO). The thread data may contain a maximum number of half iterations while decoding. The maximum number of half iterations may be placed into the circuit 154. Next, the thread data may be placed into the signals DC1_DATA-DC4_DATA. The signals DC1_DATA-DC4_DATA generally contain control information for circuits 114a-114d occupied in the thread. If some circuits 114a-114d are not occupied in the thread, the corresponding signal DC1_DATA-DC4_DATA may contain all zeros. Because of the sliding window log-MAP technique, all of the circuits 114a-114d may finish half iterations at the same time. When the half iterations are finished, the circuits 114a-114d may assert (e.g., set to a logical one state) the respective signals READY. Assertion of the signal READY may act like a "next" signal for the circuit 154, which counts down the number of finished half iterations. When number of left half iterations becomes zero, the circuit 156 generally forces the next request to the circuits 120a-120d.

Figure 6:
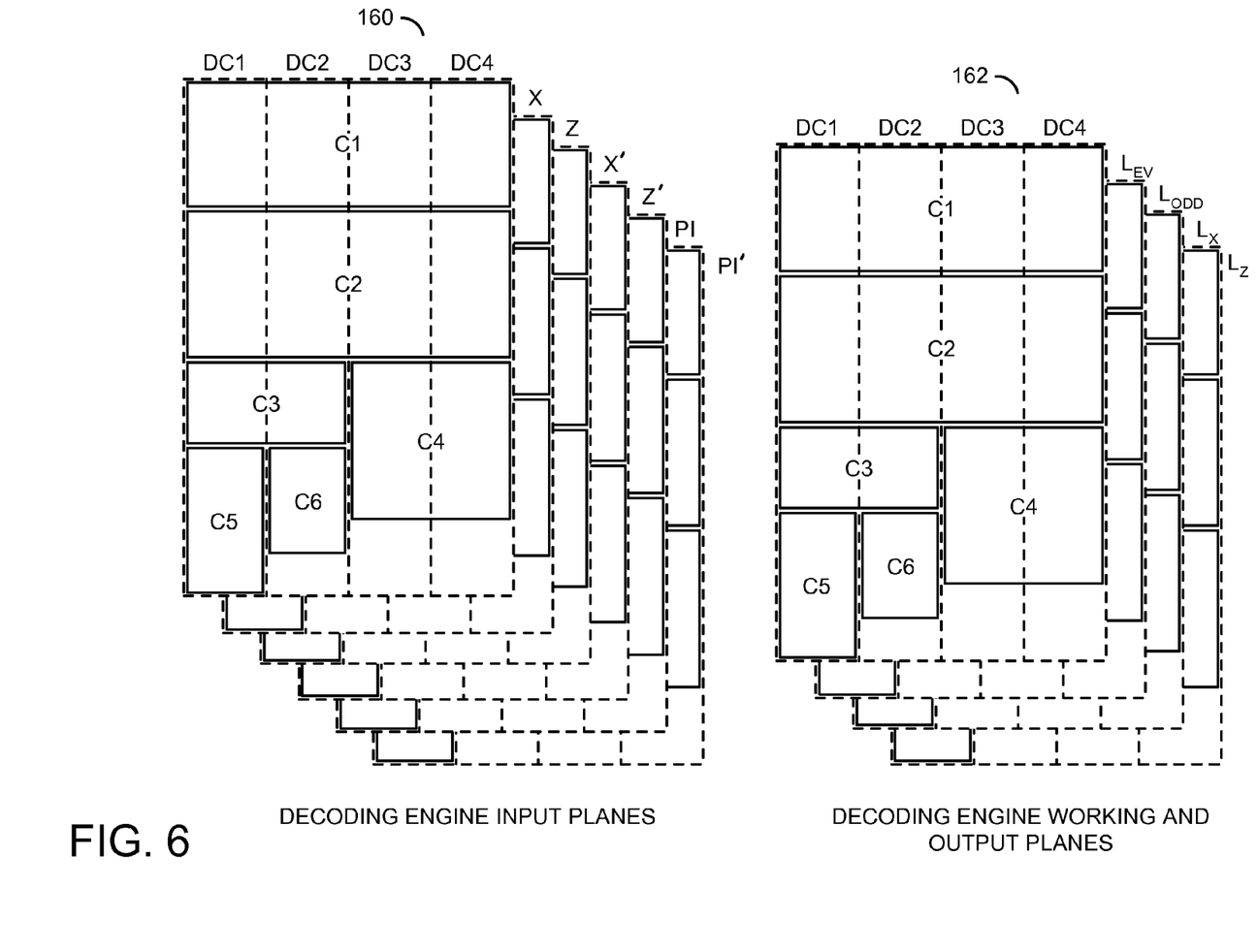
FIG. 6 is a diagram of the layering in memory circuits.

Referring to FIG. 6, a diagram of the layering in the circuits 112a-112d is shown. The layering of the circuits 112a-112d generally represents set of memories organized in two sets called "memory planes". Input memory planes 160 generally store initial data used by the circuits 114a-114d in the decoding. Output memory planes 162 generally store results of the decoding. The planes 160 may be divided into multiple planes, generally referred to as X, Z, X', Z', PI and PI' planes. The planes X, Z, X', Z' may store initial soft values of the code words. The planes PI and PI' may store interleaves tables for all code words. The plane PI may store straight permutation indices and the plane PI' generally stores inverse permutation indices. The planes PI and PI' may be used for decoding of the turbo codes. The planes 162 may be divided into multiple planes, generally referred to as Lev, Lodd, Lx, Lz planes. In case of the turbo codes, the planes Lev and Lodd may contain extrinsic L-values for even and odd half iterations of the decoding. The planes Lev and Lodd may also contain hard values of decoded bits. Each hard value generally represents a single bit that is simply concatenated with a corresponding extrinsic value and stored in a cell of the circuits 112a-112d. In the case of the convolutional codes, a single one of the planes Lev and Ladd may be used. The planes Lx and Lz generally store results of the decoding—soft values for information (Lx) and parity bits (Lz).

Each memory plane generally contains multiple (e.g., tour) pairs of memory banks. Each pair is generally represented as a column. Each pair may correspond to a respective circuit 118a-118d. The cells of the column with even addresses may be stored in an initial memory bank of the pair. The cells with odd addresses may be stored in another memory bank. Addresses of the cells inside the memory planes generally correspond to the mapping of the code words of the frame 130. For example, if X soft bits of the code word C1 are contained in the cells of the memory plane at the addresses from P to Q, the cells from P to Q of the Z' memory plane would contain Z' soft bits of the code word C1.

Figure 7:
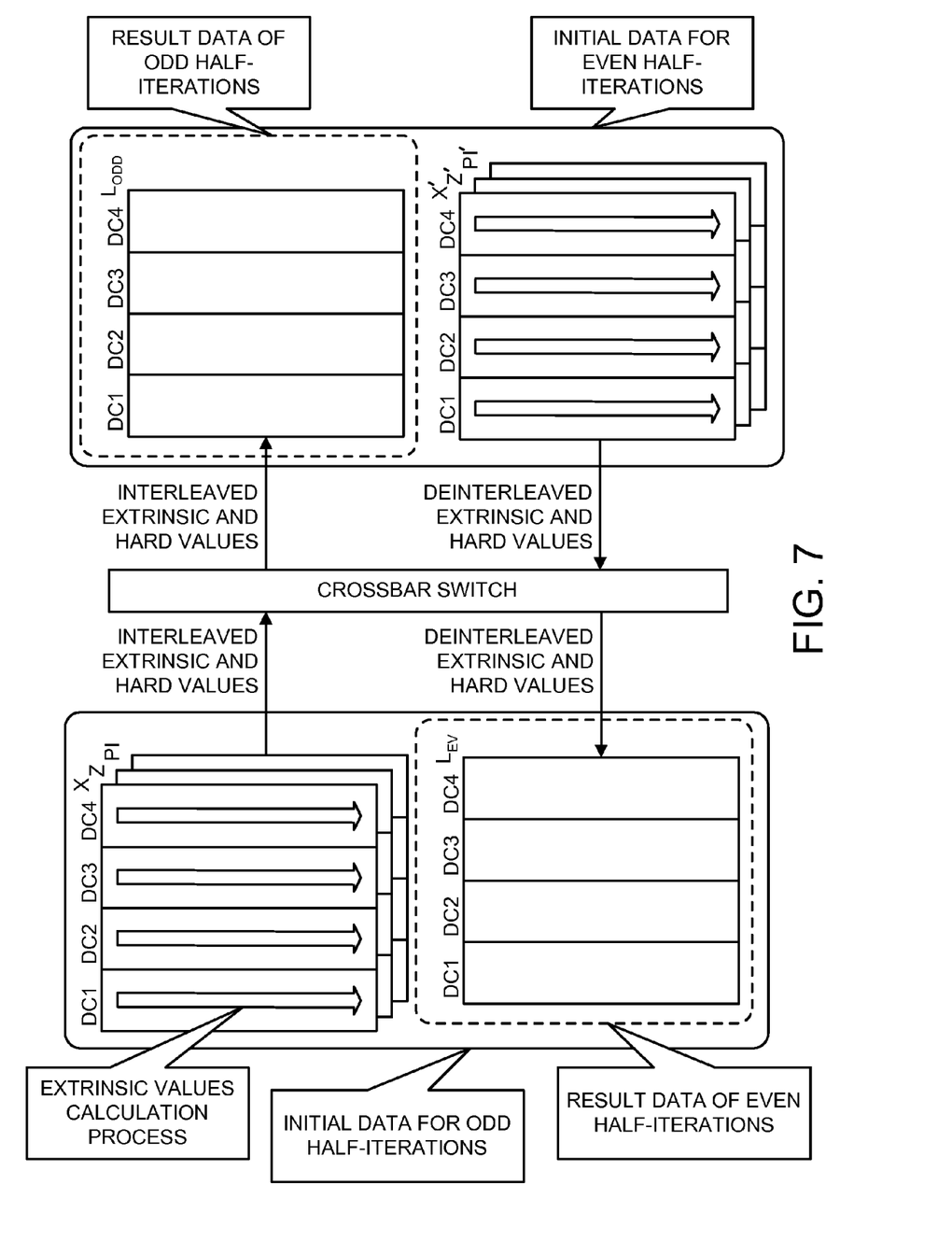
FIG. 7 is a diagram of example activity during a decoding of a turbo code.

Referring to FIG. 7, a diagram of example activity during a decoding of a turbo code is shown. While decoding, the memory planes contained in the circuits 112a-112d may store both initial data and result data for half iterations. On the odd half iterations, the initial data may be stored in the X, Z, PI memory planes. At the end of the half iterations, the result data of interleaved extrinsic values and the hard values may be stored in the Lodd memory plane. On the even half iterations, the initial data may be read from the X', Y' and PI' memory planes. After processing, the result data is generally saved into the Lev memory plane. Because of the interleaving that takes place during the half iterations, some writing collisions into the circuits 112a-112d may occur. The collisions may be solved by the circuit 116. In the case of convolutional codes, a single half iteration may be done during the decoding.

Figure 8:
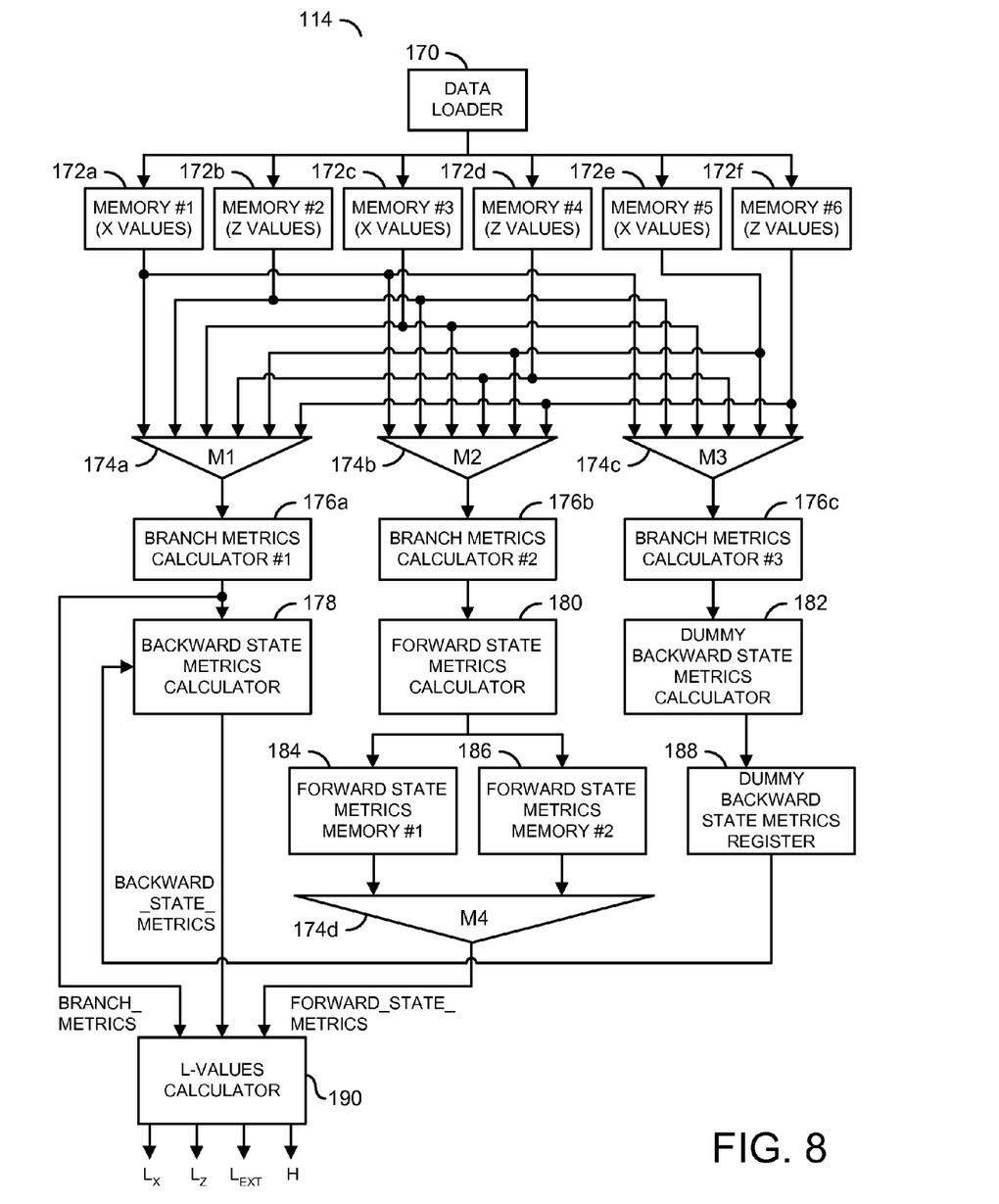
FIG. 8 is a diagram of an example implementation of a decoder core circuit.

Referring to FIG. 8, a diagram of an example implementation of a circuit 114 is shown. The circuit (or block) 114 may be representative of the circuits 114a-114d. The circuit 114 may implement a sliding window log-MAP decoder. The circuit 114 generally comprises a block (or circuit) 170, multiple blocks (or circuits) 172a-172f, multiple blocks (or circuits) 174a-174d, multiple blocks (or circuits) 176a-176c, a block (or circuit) 178, a block (or circuit) 180, a block (or circuit) 182, a block (or circuit) 184, a block (or circuit) 186, a block (or circuit) 188 and a block (or circuit) 190. The circuits 170 to 190 may represent modules and/or blocks that may be implemented as hardware, firmware, software, a combination of hardware, firmware and/or software, or other implementations.

For each window, the circuit 170 generally loads initial data into one of three pairs of the circuits 172a-172f (e.g., the circuit 172a-172b, the circuit 172c-172d and the circuit 172e-172f). The data is generally used by the circuits 176a-176c to calculate branch metrics. The circuits 176a-176c may read data from corresponding circuits 172a-176f and calculate the branch metrics for (i) forward state metrics, (ii) dummy backward state metrics, (iii) backward state metrics and (iv) L-values. The circuit 182 may calculate dummy backward state metrics using the branch metrics calculated by the circuit 176c. The circuit 182 may be initialized with an all-zero vector. The circuit 180 generally calculates the forward state metrics using branch metrics calculated by circuit 176b. The calculated metrics may be stored in the corresponding circuits 184 and 186 for subsequent use in calculating the L-values. The circuit 178 generally calculates backward state metrics using branch metrics calculated by circuit 176a. The circuit 178 may be initialized with a last vector obtained by circuit 182, which is stored in the circuit 188. The circuit 190 generally reads the forward state metrics from the corresponding memory 184 and 186 and calculates the L-values using (i) the state metrics calculated by the circuits 178 and 180 and (ii) the branch metrics calculated by circuit 176a.

The functions performed by the diagrams of FIGS. 1, 2, 5, 7 and 8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1-8 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method of parallel decoding for a plurality of communications standards comprising the steps of:
   (A) receiving a frame having a plurality of first words, wherein at least two of said first words in said frame have a different length than each other;
   (B) parsing said first words into a plurality of memories, wherein one of said memories buffers said at least two of said first words having said different length than each other; and
   (C) generating a plurality of second words by decoding parsed first words using a plurality of decoders, wherein (i) said decoders operate in parallel, and (ii) one of said parsed first words is decoded by at least two of said decoders working together in parallel.

2. The method according to claim 1, further comprising the step of:
   buffering said second words in said memories, wherein data decoded from said one of said parsed first words decoded by said at least two of said decoders resides in at least two of said memories.

3. The method according to claim 1, wherein said decoding implements logarithmic-maximum a posteriori decoding utilizing a sliding window.

4. The method according to claim 1, further comprising the step of:
   executing a plurality of threads using a plurality of controllers to control said decoding of said parsed first words.

5. The method according to claim 4, wherein each of said threads controls said decoding of a respective one of said first words.

6. The method according to claim 4, wherein one of said threads controls said at least two of said decoders operating together in parallel to decode said one first word.

7. The method according to claim 4, wherein at least two of said threads are executed in parallel to decode at least two of said first words in parallel.

8. The method according to claim 1, wherein said at least two decoders read data of said one of said parsed first words from at least two of said memories.

9. The method according to claim 1, wherein said communications standards include at least two of (i) a Long Term Evolution standard, (ii) an Institute of Electrical and Electronics Engineering 802.16 standard, (iii) a Wideband-CDMA/High Speed Packet Access standard and (iv) a CDMA-2000/Ultra Mobile Broadband standard.

10. An apparatus comprising:
   a mapper circuit configured to (i) receive a frame having a plurality of first words, wherein at least two of said first words in said frame have a different length than each other, and (ii) parse said first words into a plurality of memories, wherein one of said memories buffers said at least two of said first words having said different length than each other; and
   a plurality of decoders configured to generate a plurality of second words by decoding said parsed first words, wherein (a) said decoders operate in parallel, and (b) one of said parsed first words is decoded by at least two of said decoders working together in parallel.

11. The apparatus according to claim 10, wherein (i) said second words are buffered in said memories and (ii) data decoded by said at least two of said decoders from said one of said parsed first words resides in at least two of said memories.

12. The apparatus according to claim 10, wherein said decoding implements logarithmic-maximum a posteriori decoding utilizing a sliding window.

13. The apparatus according to claim 10, further comprising a plurality of controllers configured to execute a plurality of threads to control said decoding of said first words.

14. The apparatus according to claim 13, wherein each of said threads controls said decoding of a respective one of said first words.

15. The apparatus according to claim 13, wherein one of said threads controls said at least two of said decoders operating together in parallel to decode said one of said parsed first words.

16. The apparatus according to claim 13, wherein at least two of said threads are executed in parallel to decode at least two of said first words in parallel.

17. The apparatus according to claim 10, wherein said at least two decoders read data of said one of said parsed first words from at least two of said memories.

18. The apparatus according to claim 10, further comprising another circuit configured to arrange said first words in said frame.

19. The apparatus according to claim 10, wherein said apparatus is implemented as one or more integrated circuits.

20. An apparatus comprising:
   means for receiving a frame having a plurality of first words, wherein at least two of said first words in said frame have a different length than each other;
   means for parsing said first words into a plurality of memories, wherein one of said memories buffers said at least two of said first words having said different length than each other; and
   means for generating a plurality of second words by decoding said parsed first words using a plurality of decoders, wherein (i) said decoders operate in parallel, and (ii) one of said parsed first words is decoded by at least two of said decoders working together in parallel.

* * * * *